even more preferred liquids will become apparent to those skilled in the art from the following description of the basic process concept of this invention.

3,244,744
SEPARATION PROCESS FOR ISOPHTHALIC ACID AND TEREPHTHALIC ACID
Walker H. Bowman, Morgan Township, Porter County, Ind., assignor to Standard Oil Company, Chicago, Ill., a corporation of Indiana
No Drawing. Filed Feb. 27, 1963, Ser. No. 261,490
4 Claims. (Cl. 260—525)

This invention relates to the separation of mixtures of crystals of isophthalic acid and crystals of terephthalic acid into two crystalline products, one of which is enriched with respect to isophthalic acid and the other is enriched with respect to terephthalic acid. More specifically, this invention pertains to the physical separation of an isophthalic acid enriched crystalline product and a terephthalic acid enriched crystalline product from a crystalline mass produced by controlled nucleation and crystallization and containing a mixture of crystals of each of isophthalic acid and terephthalic acid.

Many processes have been proposed for the conversion of mixtures of isomeric dialkylbenzenes, especially mixture of xylenes, to a mixture of phthalic acids. Since o-phthalic acid is far more soluble than either iso- or tere-phthalic acids, o-phthalic acid can be readily removed by extracting the mixture of isomeric phthalic acids with such solvents as water, glacial acetic acid, aqueous acetic acids of 20 to 99% strength, and other solvents for the ortho isomer. The solids remaining after extraction contain mainly iso- and tere-phthalic acids. Solvent extraction of isophthalic acid at elevated temperatures and pressures has been proposed for separating the mixture of iso- and tere-phthalic acids. Selective conversion of one of the two acids to a more soluble or distillable derivative has also been proposed for a means of separating the two relatively insoluble phthalic acid isomers. Fractional crystallization employing controlled nucleation of first one isomer followed by conditions which permit crystal growth of the first nucleated isomer and also permit nucleation of the second isomer and thereafter permitting the second nucleated isomer to grow has been proposed to be used together with a separation system dependent upon the difference in size of crystals of isophthalic acid and terephthalic acid. The latter separation process requires a high degree of preciseness in each crystal growing step, and each crystal growing step is somewhat time-consuming.

It has now been discovered that mixtures of crystals of each of isophthalic acid and terephthalic acid can be separated into an isophthalic acid crystalline product and a terephthalic acid product, each product enriched with respect to the individual isomeric phthalic acid as compared to the starting mixture of iso- and tere-phthalic acids by a sink-float system. The separation method of this invention is not dependent upon size difference between crystals of isophthalic acid and terephthalic acid, but rather is dependent upon the density differences between crystals of isophthalic and terephthalic acid. Although the process of this invention is operative with large crystals, it is preferred to use crystalline isophthalic acid and terephthalic acid of from 5 to 100 microns, for crystals of this size range can be readily formed under conveniently obtainable short duration crystallization procedures.

It has also been discovered that crystals of isophthalic acid and terephthalic acid have densities of the same order of magnitude, but their densities differ sufficiently to make use of the difference in the sink-float separation method of this invention. The densities (g./ml.) of isophthalic acid and terephthalic acid are about 1.52 and 1.57 respectively. In accordance with this invention, a mixture of isophthalic acid crystals and terephthalic acid crystals is mixed with a liquid having a density intermediate the densities of crystals of isophthalic and terephthalic acids. Liquids having a density of from about 1.54 to 1.55 at 20° C., that is not substantially below 1.535 and not substantially above 1.555 at 20° C., are useful for the purposes of this invention. Since isophthalic acid and terephthalic acid are both virtually insoluble in any liquid at temperatures of from 0° C. to 100° C., the precise liquid to be employed as long as it is inert; i.e. will not react with the COOH groups at 0 to 100° C., is not critical. Therefore, any liquid inert at 0° C. to 100° C., and having a density as hereinbefore defined, will be useful in the process of this invention. The preferred temperature of operation in accordance with this invention is ambient temperature, about 20 to 40° C.

The process of this invention is not limited to the use of a single liquid compound for mixtures of miscible liquids and liquid solutions which are inert to the isomeric phthalic acids to be separated and have a density as hereinbefore defined will be suitable. Useful liquid solutions for the purposes of this invention include solutions of organic chemical compounds in organic solvents and solutions of inorganic compounds in organic and inorganic solvents. Aqueous solutions can be readily prepared to the hereinbefore specified density. Likewise, solutions of high specific gravity solids in low specific gravity solvents such as liquid hydrocarbons, alcohols, ethers, ketones, etc., can be readily prepared to the densities hereinbefore specified. Although alcohols will react with the COOH groups of isophthalic and terephthalic acids at elevated temperatures and pressures, the alcohols can be employed as solvents to form the liquid of the hereinbefore density range for said liquid can be used at a temperature below that at which esterification will occur. Therefore, alcohols can be considered as components of the inert separating liquid useful at temperatures in the range of 0° to 100° C., since no substantial esterification will occur at say, below 50° C.

Halogenated organics, both liquid and solid, can be used to form the inert separating liquids to be used according to the process of this invention. Hydrocarbons having one or more hydrogen replaced with such halogens as chlorine, bromine, iodine, fluorine are, as a rule, inert to iso- and tere-phthalic acids, and possess sufficiently high specific gravities so as to permit their use as solvent, solute or a component of a liquid containing one or more miscible liquids. On the basis of the hereinbefore defined properties of the separating liquids, one would not, of course, employ solutions of alkali metal or alkaline earth metal hydroxides, oxides, etc., or ammonia which would form salts of isophthalic or terephthalic acids and which would solubilize the salt of either or both phthalic acid isomer to be separated.

Illustrative of suitable separating liquids include:

(1) Mixtures of carbon tetrachloride and chloroform having a density in the range of 1.535 and 1.555 at 20° C., (2) Mixtures of ethyl bromoacetate and ethyl dibromoacetate having a density in the range of 1.535 and 1.555 at 20° C., (3) Difluoro acetic acid, (4) Mixtures of 1,2,4-trichlorobenzene and 1,2-dichlorobenzene having a density in the range of 1.535 and 1.555 at 20° C., and (5) Mixtures of 2-bromoethanol and 2-bromoethylacetate having a density in the range of 1.535 and 1.555 at 20° C., among others. Many other binary, ternary, etc. mixtures of organic liquids, solutions of organic and inorganic chemical compounds will come to the minds of chemists from the foregoing disclosure. The selection of components for the liquid of intermediate density, i.e. density in the range of 1.535 and 1.555, and the preparation of such liquids of intermediate density require only routine laboratory skill.

The following examples are given as illustrative of operations in accordance with this invention and are not intended as a limitation thereon.

*Example I*

A mixture containing 73% isophthalic acid and 27% terephthalic acid by weight is added to a liquid consisting of toluene and carbon tetrachloride and having a density of 1.54 g./ml. in a container. The mixture of solids and liquids are mixed and then permitted to settle. Although a top layer and a bottom layer of solids forms, there remains suspended in the intermediate liquid some solids. By analysis of the top layer of solids, it is found that it contains 93.5% isophthalic acid by weight, and the bottom layer contains 43% terephthalic acid.

By addition of a small amount of oil-soluble wetting agent to the toluene-carbon tetrachloride liquid to prevent agglomeration of crystals of isophthalic and terephthalic acid and by carrying out the settling step in a constant bath temperature so as to prevent thermal-convection upset of the layers, a clear liquid intermediate the top layer of isophthalic acid enriched solids and the bottom layer of terephthalic acid enriched solids is obtainable.

*Example II*

The process of Example I is repeated using as a liquid of 1.54 g./ml. density a mixture consisting of equal parts by volume of carbon tetrachloride and chloroform. Substantially equivalent separation is obtained.

As hereinbefore stated, it is preferred to employ the separation process of this invention with mixtures of isophthalic acid and terephthalic acid having crystal size of 5 to 100 microns. Such a mixture is readily obtainable by heating a mixture of isophthalic acid and terephthalic acid with 285 parts of water per part of isophthalic acid, on a weight basis, to a temperature in the range of 220 to 500° F., and a pressure to maintain water in the liquid phase, 3 to 800 p.s.i.g. is suitable until at least all of the isophthalic acid is dissolved. Thereafter the aqueous mixture may be filtered or otherwise treated by physical separation to remove the undissolved portion of terephthalic acid as a relatively high purity product and the remaining aqueous solution of isophthalic acid cooled slowly at first to nucleate both isophthalic acid and terephthalic acid and then cooled rapidly to 75 to 100° F. While dissolving all of isophthalic acid under the above conditions of elevated temperature and pressure, an amount of terephthalic acid is also dissolved amounting to about 0.1 to 0.15 of the isophthalic acid dissolved. The solution of isophthalic and terephthalic acids is cooled or evaporated, if necessary, to form a solution super-saturated with respect to isophthalic acid. The solution super-saturated with isophthalic acid is held for 5 to 20 minutes under the super-saturated conditions to nucleate crystals of isophthalic acid, then cooled an additional 15 to 30° F. slowly over a period of from 30 to 60 minutes to nucleate terephthalic acid and then cooled rapidly to 75 to 100° F. The resulting mixture of small crystals of isophthalic and terephthalic acid is separated, e.g. by filtration to recover the mixture of small crystals of isophthalic and terephthalic acid. The mother liquor is recycled to the first dissolving step at elevated temperature and pressure. More specifically, extraction of a mixture of 65 parts of isophthalic acid and 35 parts of terephthalic acid with water at 340° F. produces a solution containing per 100 pounds of water 8 pounds of a mixture of isophthalic acid (88%) and terephthalic acid (12%). The undissolved solids contain 99+% terephthalic acid. Cooling said solution to about 335° F. by removal of water followed by cooling the concentrate to about 330° F. in from 10 to 20 minutes and thence rapidly to 200° F. produces fine crystals of both isophthalic acid and terephthalic acid. The crystallized product is recovered, dried and mixed with a liquid containing equal volumes of chloroform and carbon tetrachloride with a small amount, 0.01 to 0.1% by weight, of dissolved wetting agent. The resulting mixture is permitted to settle in the absence of thermal convection upset. By withdrawing the top layer of floating crystals, a product enriched in isophthalic acid, 93 to 95%, may be obtained. This recovered crystalline product can be again subjected to dissolving in water at elevated temperature and a stepwise crystallization to nucleate and grow fine crystals of both isophthalic acid and terephthalic acid and subjected to a second treatment with a liquid of 1.54 g./ml. density. By this second sink-float separation a top crystalline product layer even more enriched in isophthalic acid, 97 to 99% purity may be obtained.

What is claimed is:

1. A process for separating a crystalline mixture of isophthalic acid and terephthalic acid into a product enriched in crystalline isophthalic acid and a product enriched in crystalline terephthalic acid with respect to said crystalline mixture which comprises combining by admixing at 0 to 100° C. said crystalline mixture with an inert homogeneous liquid having a density in the range of about 1.535 to 1.555 at 20° C. and having no substantial solvent capacity for either of said phthalic acids at 0 to 100° C., settling the mixture of liquid and crystals thereby forming as three phases a top floating crystalline layer enriched with respect to isophthalic acid, a bottom crystalline layer enriched with respect to terephthalic acid, and an intermediate liquid layer, removing the top layer for recovery of a product enriched with respect to isophthalic acid and removing the bottom layer for recovery of a product enriched with respect to terephthalic acid.

2. The process of claim 1 wherein said inert liquid has a density of 1.54 g./ml.

3. The process of claim 1 wherein said inert liquid is a mixture of toluene and carbon tetrachloride having a density of 1.54 g./ml.

4. The process of claim 1 wherein said inert liquid is a mixture of equal volumes of chloroform and carbon tetrachloride having a density of 1.54 g./ml.

References Cited by the Examiner

UNITED STATES PATENTS 3,043,870    7/1962    Hetzel _____ 260—525

LORRAINE A. WEINBERGER, *Primary Examiner.*

LEON ZITVER, *Examiner.*